Dec. 9, 1941.          B. C. PLACE          2,265,393
FASTENER
Filed Nov. 5, 1938
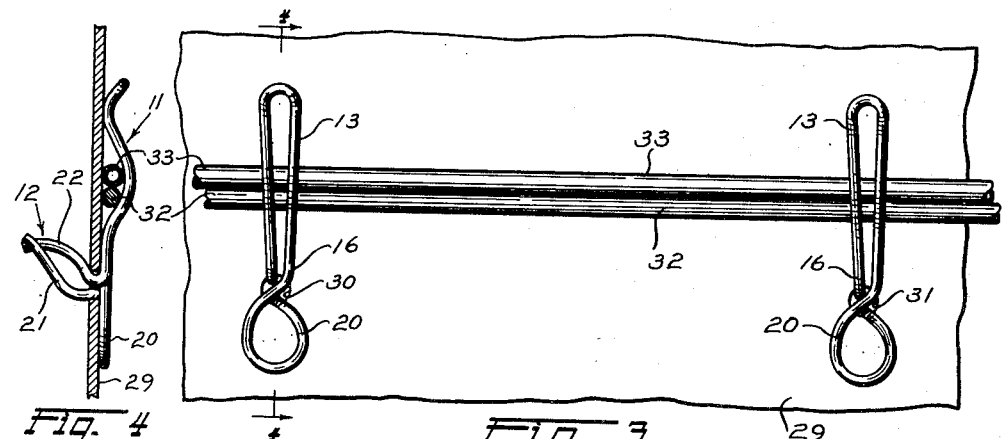
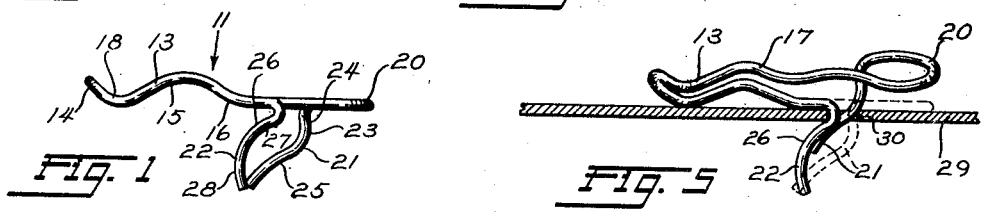
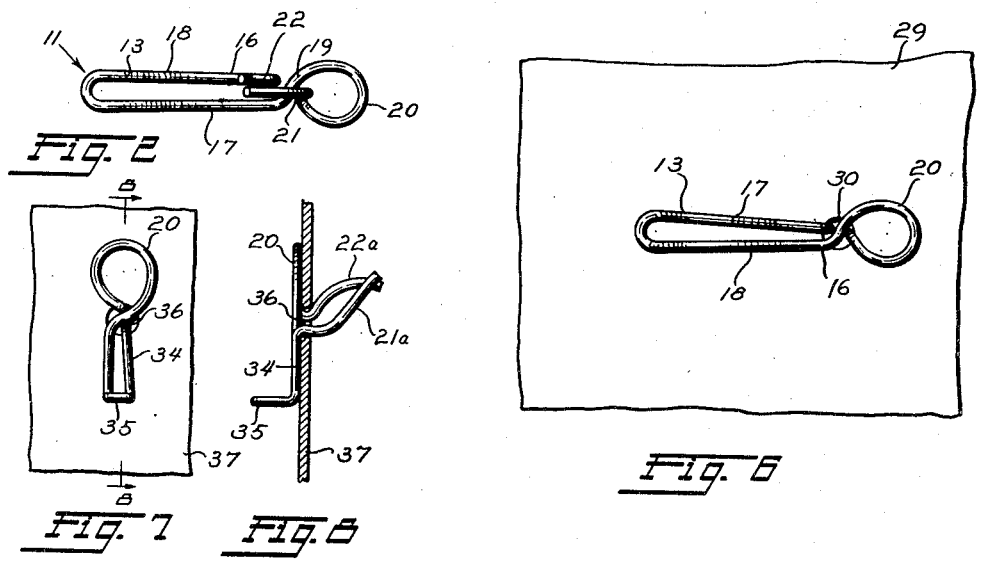
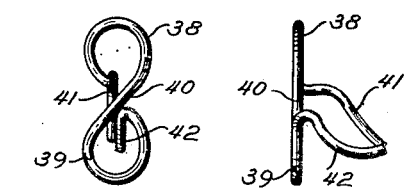
Inventor
Bion C. Place
By Strauch & Hoffman
Attorneys Patented Dec. 9, 1941

2,265,393

UNITED STATES PATENT OFFICE 2,265,393

FASTENER

Bion C. Place, Detroit, Mich., assignor of one-half to George E. Gagnier, Detroit, Mich.

Application November 5, 1938, Serial No. 239,133

12 Claims. (Cl. 24—73)

The present invention relates to spring stud fasteners capable of sustaining or supporting a considerable load without liability of disconnection. More particularly, the invention is concerned with a spring stud fastener or clip designed so that the holding portions thereof may be readily inserted in an opening or socket by hand, but which when once inserted can not be removed except by the use of tools, and then only by following a definite mode of procedure releasing the holding elements part by part.

The use of spring stud fasteners as heretofore constructed has been greatly limited because of the fact that the weight or load that could be sustained by the fastener was quite limited. Accordingly, bolts and screws are widely used in situations in which it is difficult to apply nuts to bolts, or to insert screws and turn them into holding position; and even in situations in which bolts or screws can readily be applied, they are widely used instead of spring stud fasteners because of the inability of such fasteners, as heretofore constructed, to sustain any real load in spite of the fact that spring stud fasteners can be applied in much less time and with greater facility than screws or bolts and in spite of the fact that spring stud fasteners, if properly constructed, do not become loose when applied to structures subject to vibration after the manner of screws or bolts.

The primary purpose of the present invention is to provide a spring stud fastener or clip so constructed as to be able to support or sustain a very substantial load, and without sacrificing the ease of insertion of the spring fastener or clip.

A still further object of the invention is to provide a spring stud fastener or clip having a portion consisting only of two legs connected together so that the legs may be entered in the opening or socket in succession, rather than simultaneously, as was the universal custom in fasteners of the same general type.

A still further object of the invention is to provide a spring clip or fastener having integral attaching elements in the form of resilient legs, one of which has a hook-like portion and is designed to be entered in an opening or socket in advance of the other, and the other leg of which has a convexly rounded portion and is intended to be entered following the engagement of said first leg in the opening or socket, the second leg serving the purpose merely to maintain the hooked engagement between the first leg and the structure that is provided with the opening or socket.

A still further object of the invention is to provide an improved form of clip having a securing portion consisting of two legs designed for entry in succession in an opening or socket, and so constructed as to permit the clip to be satisfactorily used to attach cables, conduits, rods or the like to supporting structures of various kinds, such as the chassis frame of an automobile for example.

A still further object of the invention is to provide an improved cable clip or like clamp that may be applied by hand, and that, when so applied, provides a tongue overhanging the structure against which the cable is to be secured and which tongue is so rigidly held against the support that the cable can be forced beneath it without danger of disconnecting the clip or clamp from the support.

A still further object of the invention is to provide an improved means, for inclusion in a clip or the like and formed for engagement with an apertured support, consisting only of two legs of special shape and related to the body or head of the clip, fastener or the like in such a way as to permit the legs to be sprung into holding position in succession by a sequence of operations that may be conveniently carried out by hand providing an engagement of great tenacity, which can not be broken by vibration of the structure to which the clip, fastener or the like is applied, but only by following a definite sequence of operations necessitating the use of a tool to bring about disengagement.

Still further objects of the invention will appear as the description thereof proceeds in connection with the accompanying drawing, in which:

Figure 1 is a side elevational view of a spring clip including the present invention in its present preferred form, said clip being designed to clamp cables, logs, conduits or the like against a support;

Figure 2 is a view of the clip illustrated in Figure 1 as seen in plan looking along the legs constituting the entering or stud part of the clip;

Figure 3 is a fragmentary plan view showing several clips of the type illustrated in Figures 1 and 2 in assembled relation to a support and maintaining a rod and tube clamped against said support;

Figure 4 is a sectional view taken on the plane indicated by the line 4—4 in Figure 3;

Figure 5 is a fragmentary sectional view showing the clip of Figures 1 and 2 partially applied to the support.

Figure 6 is a plan view of the parts illustrated in Figure 5;

Figures 7 and 8 are respectively fragmentary elevational and sectional views of a modified form of clip and showing said clip applied to a vertical wall in position to support a picture, shelf or the like, the sectional view being taken on the plane indicated by the line 8—8 of Figure 7; and Figures 9 and 10 are respectively top plan and side elevational views of a spring stud fastener including the present invention.

Like reference characters indicate like parts throughout the several figures.

Referring to Figures 1 and 2, the clip there shown includes a head designated as a whole by 11 and a shank or stud part designated 12. The head 11 is formed from the mid-portion of a single piece of properly tempered spring wire and consists of a U-shaped tongue 13, formed by doubling a portion of the piece of wire. The end of the tongue 13 is preferably bent upward as shown at 14 to facilitate the passage of a cable, conduit or the like presently to be referred to beneath said tongue. Preferably, the intermediate portion of the tongue is bowed upwardly as indicated at 15 providing a recess for the reception of the tube, conduit, cable or the like, if desired. Recesses snugly fitting the elements to be received beneath the tongue 13 may be formed in the portion 15 of said tongue instead of the bowed portion illustrated in the drawing.

The head 13 also includes a bearing portion 16 consisting of straight portions at the inner end of the tongue 13, said portions being intended to bear flatwise upon the support to which the clip is applied at one side of the opening provided therein for the reception of the shank in the manner presently to be pointed out.

The arm 17 of the U formation already described is curved toward the other arm 18 of said formation as indicated at 19, and the portion of the wire beyond said curved portion 19 is then bent into a loop 20 of sufficient size to extend over a substantial area of the support at the other side of the opening from that contacted by the bearing portion 16, said loop 20 forming a second bearing portion and terminating approximately in alignment with the arm 17.

The shank or stud part of the clip is formed from the ends of the wire by bending said ends away from the plane of the bearing portions 16 and 20. The shank includes only legs 21 and 22. The leg 21 is carried by the loop 20 and includes a convexly curved surface 23 providing a gradually inclined holding shoulder 24 adjacent the loop 20 and a gradually inclined guiding surface 25 extending to the end of said leg. The leg 22 is carried by the other arm 18 of the U formation of the head and includes a hook-like portion 26 providing a sharp holding shoulder 27 adjacent the head of the clip and a smoothly-rounded guiding surface 28 extending to the end of said leg. Preferably, the legs 21 and 22 are arranged to pass each other in scissors fashion. It will be readily understood that said legs may be shorter than illustrated. Preferably, they are made to normally lap at the end of the shank, such arrangement facilitating initial entry of the stud part or shank of the clip in the opening or socket provided to receive it.

The clip just described is intended particularly to clamp elements such as wires, cables, conduits, rods or the like against a support. A preferred way of using said clip is illustrated in Figures 3 and 4 in which 29 designates the support having openings 30 and 31 therein providing sockets for the reception of the shank of the clip. The support 29 may be the chassis frame of an automobile, for example. As many openings, similar to 30 and 31, are provided in said structure as are needed for application of the desired number of holding clips, the openings following the line along which the cable, conduit, tube or the like is to take.

Preferably, the clips of the present invention are first applied to the frame and their holding tongues 13 arranged to extend parallel to each other, the bearing portions 16 and 20 resting firmly against the frame on the opposite side of each opening. After the clips have been secured to the frame, the cable, such as 32, is inserted under the tongue and forced therebeneath. The same tongue may be used to hold a tube, such as the tube 33 which may be the gasoline line or the like, said tube being likewise preferably inserted from the end of the tongue and forced therebeneath, the body of the tongue being resilient as already stated. Preferably, when the element held by the clip is in place, the tongue is under some stress so that a continuously effective yielding pressure is exerted by the tongue against clamping the element against the support.

The manner of inserting the shank or stud part of the clip in the openings in the support differs radically from that employed in inserting any stud parts heretofore known. This will now be described with reference to Figures 5 and 6, which show the clip partially inserted in the opening 30 of the structure 29. In attaching the clip to the structure, the two legs which are normally in the position illustrated in Figures 1 and 2 are brought opposite the opening 30 and the ends of said two legs are inserted in the opening as far as they will readily go. Pressure is next applied only to the arm 18 of the U formation of the head at the bearing portion 16 thereof to force said arm 18 out of the plane of the other arm thereby bringing the leg 22 completely within the opening to the position illustrated best in Figure 5. The hook portion 26 is thus engaged with the edge of the opening 30 and thus the leg 22 is first brought into holding position. Then pressure is applied to the arm 18 of the U formation at the point 16 thereof, or to the loop 20, to force the other leg 21 through the opening to the dotted line position illustrated in Figure 5. In the final position of the leg 21 the gradual inclined shoulder 24 is brought opposite the inner corner of the opening 30 at a point diametrically opposite that engaged by the hook-like portion of the other leg. Preferably, the legs of the fastener are so spaced in the original construction thereof that when the fastener is in holding position the leg 21 is bent somewhat inwardly towards the other leg during the operation of inserting said last-named leg whereby there is no possibility of play between the shank of the fastener and the opening in which it is inserted.

The operations of successively inserting the legs 22 and 21 in the opening 30 may be readily carried out by hand. In other words, the shank of the fastener may be inserted with the facility that characterizes the insertion of any snap fastener in its opening or socket. However, when the fastener is in its final or holding position, it cannot be detached from the structure 29 by any pull exerted on the tongue 13 tending to draw it away from said structure for the purpose of inserting therebeneath the element which is desired to be clamped against the structure. The reason for this is apparent inasmuch as a hooked engagement is provided between the clip and the structure by the leg 22. The essential purpose of the leg 21 may be said to be to prevent bodily shifting of the clip in a plane parallel to the surface of the structure 29 which shifting is necessary to disengage the hook-like portion of the leg 22 from said structure. It will thus be apparent that once the fastener is in assembled position, the clip is rigidly connected to said structure, and that the tongue thereof is secured as firmly to the support as could be accomplished by the use of any screw or bolt.

While the clip can not be removed from the structure by a pull exerted on the clip as a whole, it will be understood that, by reversing the operation of inserting the clip, it can be removed from said structure. In effect, however, an unlocking operation is necessary to do this, it being essential, first, that the bearing portion 20 be pried away from the support 29 to free the leg 21 from engagement with said structure. A tool is necessary to pry the bearing portion 20 away from the structure 29 once the clip has been applied so that inadvertent disengagement of the clip from the support can not occur. For this reason the connection provided is superior to that provided by an arrangement involving screws or bolts which are liable to become loose. It will be understood further that since the legs 22 and 21 are resilient when the clip is in holding position, it exerts a pull on the head drawing it firmly against the support regardless of reasonable variations in the thickness of the supporting structure at the point of application of the clip.

It will thus be seen that the present invention provides a fastener or clip that may be applied to the structure to which it is to be attached by hand with the facility that characterizes an ordinary snap fastener, but that when the clip has been thus applied by a succession of operations, it can not be removed by any pull exerted on the clip as a whole, but only by following a sequence of operations analogous to an unlocking action.

In the modification of the invention illustrated in Figures 7 and 8, a fastening clip shaped to provide a support for a shelf or the like is disclosed. The clip of this form of the invention is provided with a flat tongue after the manner of the tongue 13 in the clip already described as designated by 34, the end of said flat tongue 34 being turned outwardly as indicated at 35. In the clip of Figures 7 and 8 the legs are like those forming a part of the clip first described, except that hook-like leg 21a is formed from the end of the wire of which the loop 20 is formed, while the other leg 22a that has the convexly-rounded surface is formed from the end adjacent the tongue 34, the arrangement being thus the reverse of that first described. It will be readily understood that the clip of this form of the invention when it is applied to an opening or socket 36 in a wall, such as a vertical wall 37, the portion 35 will provide a bracket upon which to support a shelf or the like in co-operation, for example, with a clip similarly attached to a spaced vertical wall. Though the clip of this form of the invention may be inserted with facility, it is capable of standing substantial loads without disconnecting the clip. In fact, the clip will support any load that can be sustained by the outstanding portion 35 without danger of disconnection of the clip from the wall 37. The tongue 34 may be made of any length and may be bent into the form of a hook of the desired size, to form a garment hook or the like.

In the further modification of the invention illustrated in Figures 9 and 10, a spring stud fastener including the present invention is illustrated. Said fastener includes an elongated head consisting of loops 38 and 39 disposed in the same plane and connected together by a curved portion 40 of a single piece of wire so that the loops 38 and 39 are substantially spaced permitting an independence of action of the free ends thereof which carry the legs 41 and 42 which are preferably shaped in the manner already described with reference to the legs 21 and 22 in the preferred form of clip.

The entering part of the spring stud fastener just described is inserted in exactly the same manner as the entering part of the clip first described and the fastener may be put to any of the uses to which spring stud fasteners have heretofore been applied, such, for example, as the securing of trim panels, moldings, or the like to metallic supporting structures. Of course, in such uses the material secured by the fastener is disposed beneath the head of the fastener and clamped between said head and the support by the fastener. This is the contemplated mode of use of such a fastener as is illustrated in Figures 9 and 10, the fastener of these figures being intended to be used in situations in which the fastener is subjected to considerable strain, and in which it is not intended that the article secured by the fastener be readily removable.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wire spring stud fastener, comprising a head consisting in an elongated part return-bent at opposite ends to provide loop-like head portions, the return-bent portions forming relatively movable head portions, and a shank consisting only of two legs pendent respectively from said return-bent portions between said loop-like head portions whereby said legs can be inserted in succession in an opening or socket.

2. The fastener defined in claim 1 in which said legs are arranged to pass each other in scissors fashion and in which one of said legs has a hook-like formation and the other a convexly-rounded surface.

3. A one-piece wire clip to clamp wires, cables, conduits or the like against a supporting structure, comprising a head consisting in an elongated U-shaped tongue including a mid-portion of said piece of wire and a loop-like bearing portion, said portion and said U-shaped tongue being designed to contact flatwise respectively over a substantial area of the top surface of said structure at opposite sides of an aperture therein, and a pair of relatively movable securing portions extending from said bearing portion and said U-shaped tongue respectively, said last-named portions each including a leg formed from an end of said piece of wire and having a shoulder to engage the under surface of said structure adjacent said aperture, at least one of said shoulders forming an acute angle with the plane of said head.

4. In combination, a support having an aperture, a cable or the like bearing upon said support, and a clip to clamp said cable against one side of said support consisting in a tongue overlying the cable and bearing portions extending continuously rearwardly of said tongue and resting flatwise in spaced relation on said side of the support at opposite sides of said aperture, and means extending through said aperture consisting in a pair of bodily-movable legs provided with shoulders of varying width and sharpness arranged to engage the other side of said support.

5. In combination, a support having an aperture, a cable or the like bearing upon said support, and a clip to clamp said cable against one side of said support consisting in a tongue including two spaced wire parts overlying the cable at one side of said aperture, and a curved wire bearing portion extending continuously rearwardly of said tongue and resting flatwise on the support at the opposite side of said aperture, wire legs carried by said tongue and bearing portion respectively and extending through said aperture, one of said legs being curved beneath the other side of said support under said tongue.

6. A clip to clamp an element such as a wire, cable, conduit or the like against one side of a support having an aperture, comprising a head consisting in an elongated resilient tongue having loop-like portions to firmly bear flatwise upon the support at opposite sides of said aperture, said portions being connected at one side of each loop and unconnected at the other loop side and means to detachably connect said portions to said support including a pair of bodily-movable legs carried by the unconnected loop sides respectively, one of said legs having a hook-like portion and the other a rounded surface.

7. A wire clip to clamp a cable or the like against a support, consisting of a U-shaped tongue including the mid-portion of a piece of wire, a loop-like bearing portion carried by one arm of said U-shaped tongue, and an attaching means for said clip, said attaching means being carried by the other arm of said U-shaped tongue and by said bearing portion respectively including a pair of legs formed from the ends of said piece of wire, said legs being disposed for movement in planes perpendicular to the plane of said bearing portion and tongue and for separate insertion and having shoulders formed thereon, one of said shoulders being sharp and the other rounded.

8. A spring stud fastener including a head constructed of a portion of a single piece of resilient metal and a shank constructed from the remainder of said piece, said head including two relatively long arms disposed in side by side relation and connected together at one end, and said shank consisting of two legs carried respectively by said arms and pendent therefrom at points remote from the point of their connection whereby said legs may be relatively moved bodily by manipulation of one of said arms with respect to the other, one of said legs having a hook-like formation and the other having a convexly-rounded surface.

9. A clip to clamp an element such as a wire, cable, conduit or the like against one side of a support having an aperture, comprising a head consisting in an elongated resilient tongue and a loop-like portion arranged in end to end spaced relation to firmly bear flatwise upon the support at opposite sides of said aperture, and means between said tongue and portion to detachably connect said head to said support including movable legs carried by said tongue and loop-like portion respectively, one of said legs having a hook-like portion and the other being bowed between its ends.

10. Means to provide ready spring engagement with an apertured support and difficult disengagement from said support, consisting in a head formed to provide resiliently united relatively movable parts, legs carried by said parts whereby said legs are yieldingly connected together for substantial bodily relative movement permitting successive entry of the legs in said aperture, one of said legs having a hook-like portion shaped for passage through said aperture in advance of the other leg, and the other leg having a rounded portion shaped for subsequent passage through said aperture and to then maintain said first leg in holding position until said other leg is withdrawn from the aperture.

11. A one-piece wire clip to clamp wires, cables, conduits or the like against a supporting structure, comprising a head consisting in an elongated U-shaped tongue including a mid-portion of said piece of wire, a loop carried by one arm of the U formation, said loop and said U-shaped tongue being disposed in the same plane to contact flatwise over a substantial area of the top surface of said structure at opposite sides of an aperture therein, and a pair of securing portions extending from said loop and from the end of the other arm of said U formation, respectively, said last-named portions each including a leg formed from an end of said piece of wire and disposed to pass through said aperture, one of said legs having a hook-like formation and the other having a convexly-rounded surface.

12. A one-piece wire clip to clamp wires, cables, conduits or the like against a supporting structure, comprising a head consisting in an elongated U-shaped tongue including a mid-portion of said piece of wire and a bearing portion in the form of a loop formed of another mid-portion of said wire, one side of said loop being joined to one arm of said U-shaped tongue and a pair of securing portions extending from said loop and said tongue respectively, said last-named portions each including a leg formed from an end of said piece of wire, one of said legs having a portion forming an acute angle to the plane of said head and the other having a rounded surface.

BION C. PLACE.